Jan. 7, 1930.　　　　I. L. GOTCHER　　　　1,742,248
DUMP BODY FOR VEHICLES
Filed June 1, 1928　　　2 Sheets-Sheet 2

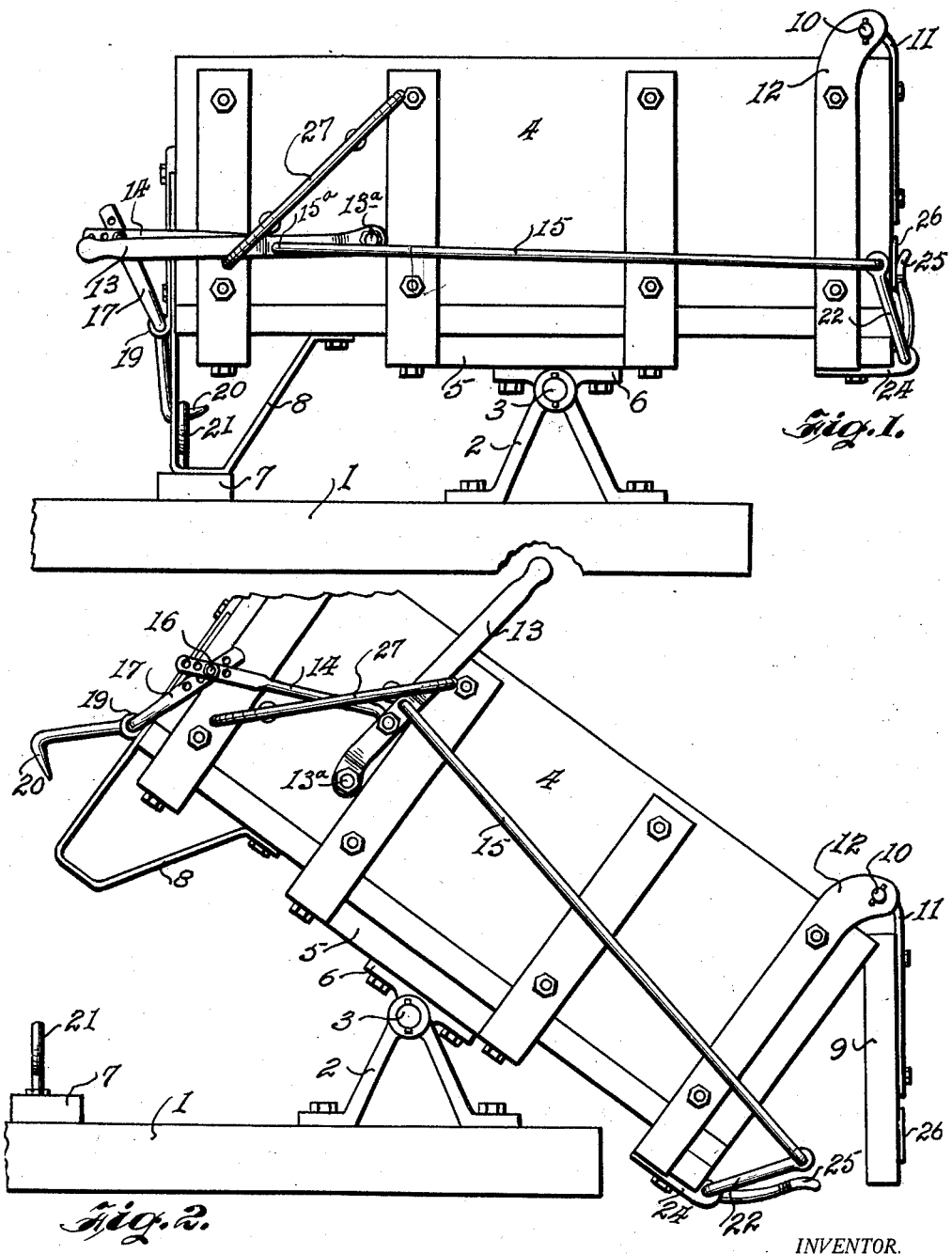

INVENTOR.
I. L. Gotcher,
BY John M. Spellman
ATTORNEY.

Patented Jan. 7, 1930

1,742,248

UNITED STATES PATENT OFFICE

IRVIN L. GOTCHER, OF BRADSHAW, TEXAS

DUMP BODY FOR VEHICLES

Application filed June 1, 1928. Serial No. 282,083.

This invention relates to that type of dump bodies used for hauling sand, gravel, dirt or other like materials and that is unloaded by elevating the front end and allowing the load to slide out at the back end to the ground by gravity.

The object of the invention is to provide a quick and easy means of accomplishing the above, with little effort on the part of the operator and by the manipulation of only one lever, to unlock the device, and open the end-gate so that the contents may be released and dumped where desired.

Another object of the invention is to provide a device cheaply manufactured, and with few parts to wear and get out of order or require attention, and that is dependable on account of its simplicity and rigid construction.

Further objects, and objects relating to structural details, will definitely appear from the detailed description to follow.

I accomplish the objects of my invention by the devices and means described in the following specification. The invention is clearly defined and pointed out in the claim.

A structure which is a preferred embodiment of my invention is clearly illustrated in the accompanying drawings forming a part of this application, in which:

Figure 1 is a side elevation view of my improved body dumping mechanism,

Figure 2 is the same as Figure 1 but in a dumped position,

In the drawings similar reference characters refer to similar parts throughout the several views.

Figure 3:
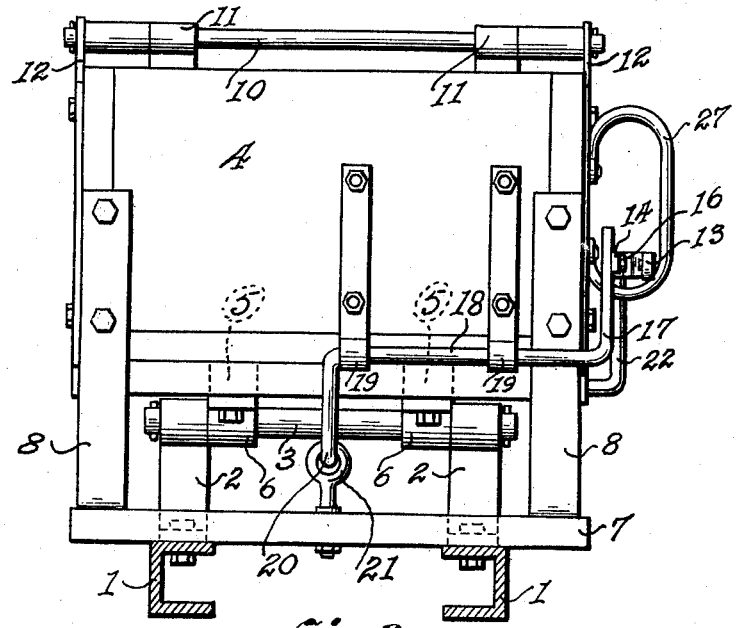
Figure 3 is a front end view.
Figure 4:
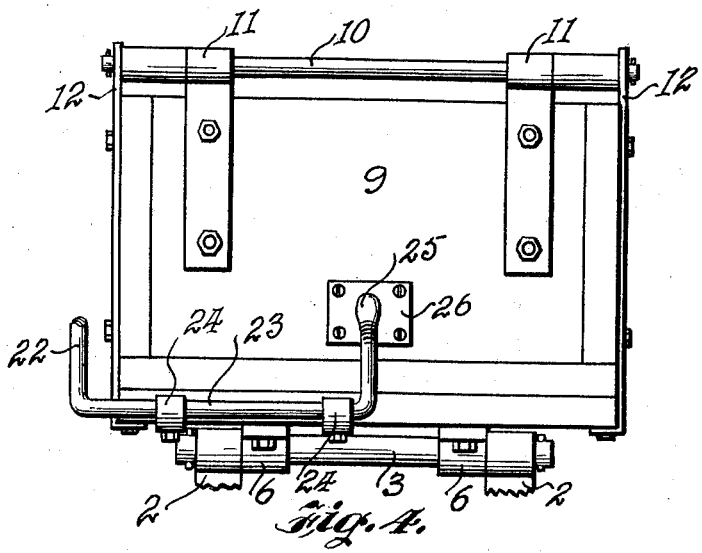
Figure 4 is a rear end view showing the mechanism for automatically releasing the end-gate, when contents are being dumped, or holding it closed when this is desired.

Referring to the drawings, the numeral 1 designates the frame of a truck chassis, and to the top of this frame member are bolted the brackets 2 that support the ends of the shaft 3. To the bottom of the truck body 4 and running parallel with its length are re-enforcing members 5 to which are bolted the bearings 6. These bearings are located inside of the brackets 2 and pivot upon the shaft 3 permitting the body 4 to be tilted as shown in Figure 2. Across the members 1 and bolted thereto is a crossbeam 7 on which the legs 8 rest when the body 4 is in a down position. At the rear of the body 4 is an end-gate 9 that swings from the cross rod 10 by hangers 11, the cross rod being supported at its ends by the bracket members 12.

I make no claim in this application for any of the foregoing, but my invention consists of a means for locking the body 4 in a down position, for unlocking same when it is desired to tilt and unload the contents thereof and to open the end-gate, all with the manipulation of one lever. I will now describe this mechanism in detail.

On the side of the body 4 and well towards the front is located a lever 13 pivoted at its lower end on the bearing 13$^a$. Attached to this lever and removed somewhat from its pivoted end is a rod 14 extending towards the front and the rod 15 extending rearward. The front end of the rod 14 is flattened and a number of adjusting holes provided in same, and is attached pivotally by the bolt 16 to the lever 17.

The lever 17 is a part of the shaft 18 which is supported by and rocks in the bearings 19. The end of the shaft 18 is bent at right angles and terminates in a hook 20 that engages the eye 21 and locks the body 4 in a down position when the lever 13 is down.

The rear end of the rod 15 is pivotally attached to the lever 22 which is a part of the shaft 23. The shaft 23 is supported by and rocks in the bearings 24. The end of the shaft 23 is bent at right angles forming an arm that terminates in a flattened, curved bearing point 25, that bears against the friction plate 26 and holds the end-gate securely closed when the body 4 is in a down position. 27 is a guard and stop for the lever 13.

To dump the contents of the body 4 the lever 13 is pulled upward, the guard 27 limiting its movement, this disengaging the hook 20 from the eye 21, through the medium of the rod 14, lever 17 and shaft 18, the same movement pushing the rod 15 rearward against the lever 22, this releasing the end-gate from the pressure of the arm 25 permitting it to swing outward by gravity when the front end of the body is raised to the dumping position. It will be noted in Figure 1 that, when the body 4 is in the position shown, the end of the rod 15 and designated by the numeral $15^a$ is not in alignment with the pivotal point $13^a$ of the lever 13, but is slightly lower. This is important as it locks the mechanism and prevents pressure of the contents of the body on the end-gate from throwing the mechanism and dumping the load before it is desired to do so. It is also evident that the length of the rod 15 must be just sufficient to close the end-gate and permit the lever 13 to come to rest on the lower part of the stop 27, otherwise the lever would not come to rest at the proper point.

It is, of course, evident that my invention is susceptible to various modifications and changes which would be within the spirit of this invention without departing from the scope of the following claim.

What I claim is:

The combination with a vehicle chassis, of a body pivoted thereon, a gate pivoted at the rear of said body, and means for releasably locking said body to said chassis and to said gate, said means comprising a hand lever pivoted to the side and near the front of said body, a rear rock shaft journaled on said body below said gate, said rock shaft having one of its ends forming an arm for engaging said gate and having its opposite end forming a rear operating lever, a rear connecting rod having its ends pivoted respectively to the free end of said rear operating lever and to said hand lever intermediate the ends of said hand lever, a front rock shaft journaled on said body at the front end of said body, an eye projecting from said chassis, said front rock shaft having one of its ends forming a hook for engaging said eye and having its opposite end forming a front operating lever, a front connecting rod having its ends pivoted respectively to the free end of said front operating lever and to said hand lever, whereby the rearward movement of said hand lever operates to simultaneously release said hook from said eye and said arm from said gate to permit the pivoting of said body on said chassis and the dumping of the contents of said body.

In testimony whereof I affix my signature.

IRVIN L. GOTCHER.